United States Patent [19]

Wallace, Jr.

[11] Patent Number: 4,832,182

[45] Date of Patent: May 23, 1989

[54] BULK MATERIALS HANDLING MACHINE HAVING A TRACTOR DRIVE

[75] Inventor: Walter J. Wallace, Jr., Alameda, Calif.

[73] Assignee: W.J. Wallace Systems, Inc., Barrington, Ill.

[21] Appl. No.: 135,498

[22] Filed: Dec. 18, 1987

Related U.S. Application Data

[63] Continuation of Ser. No. 838,349, Mar. 11, 1986, abandoned.

[51] Int. Cl.⁴ .............................................. B65G 17/36
[52] U.S. Cl. .................................... 198/509; 198/833; 198/711
[58] Field of Search ............... 198/509, 707, 710–714, 198/833

[56] References Cited

U.S. PATENT DOCUMENTS

| | | | |
|---|---|---|---|
| 2,224,282 | 12/1940 | Weinschenk | 198/509 X |
| 2,607,136 | 8/1952 | Hellums | 198/707 X |
| 3,378,130 | 4/1968 | Wallace | 198/509 |
| 3,688,893 | 9/1972 | Wallace, Jr. | 198/509 |
| 4,264,003 | 4/1981 | Gill | 198/509 |
| 4,336,877 | 6/1982 | Gill | 198/509 |

Primary Examiner—Frank E. Werner
Assistant Examiner—D. Glenn Dayoan
Attorney, Agent, or Firm—Burmeister, York, Palmatier, Hamby & Jones

[57] ABSTRACT

An endless loop tractor drive mechanism has equally spaced pushers meshing with a bucket train where its filled circular buckets are traveling along a substantially straight ascending path to a dumping support wheel. Wire rope cables or other flexible tension elements extend between the buckets. The pushers have drive rollers for pushing the buckets, and additional rollers for guiding the cables. Additional support wheels guide the bucket train along a catenary loading span where the buckets are dragged through bulk material to fill the buckets. At least two pushers engage at least two successive buckets at all times, to distribute and share the lifting load among two or more buckets. Due to the straight ascending path, the cables are not flexed when the lifting load is applied. Thus, the combination of high tensile stresses and high cable flexure is avoided. Wear and tear on the cables are thereby minimized. Fraying and breakage of the cables are no longer problems. The cables are flexed around the dumping wheel, but the tensile stresses in the cables are low, because most of the driving effort has already been exerted by the tractor drive mechanism. The pushers are supported between two endless tractor drive chains, trained around sprockets on rotatable shafts, one of which is power driven. Guide channels embrace the drive chains to stabilize the positions and orientation of the pushers as they mesh with the bucket train.

20 Claims, 4 Drawing Sheets

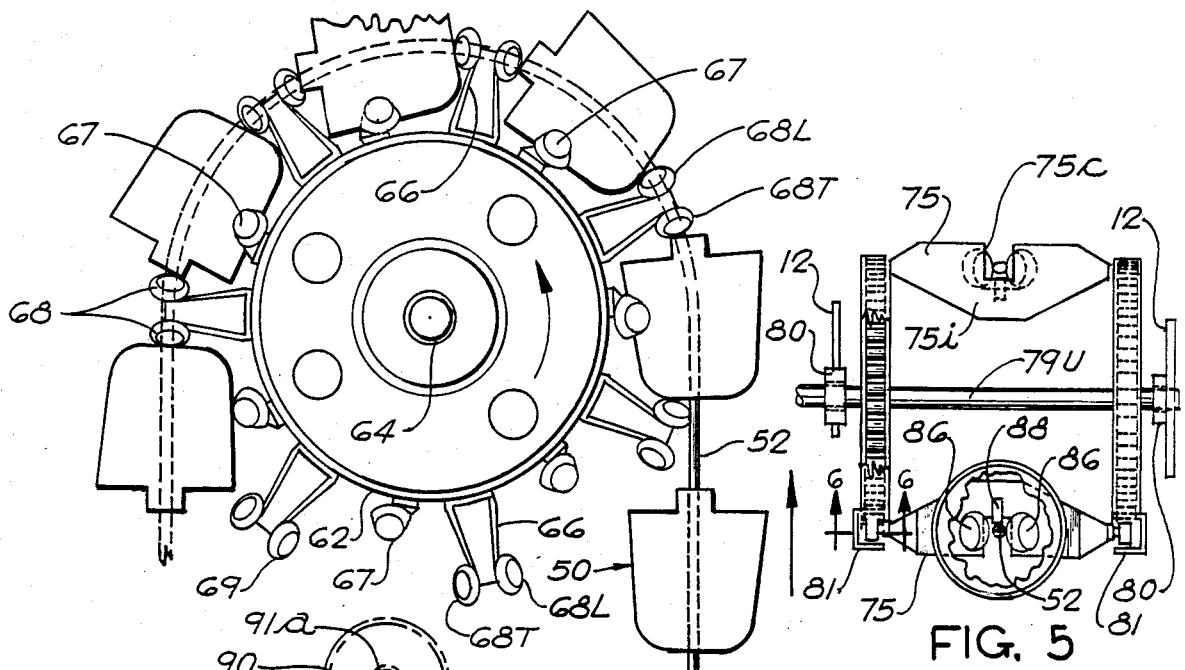
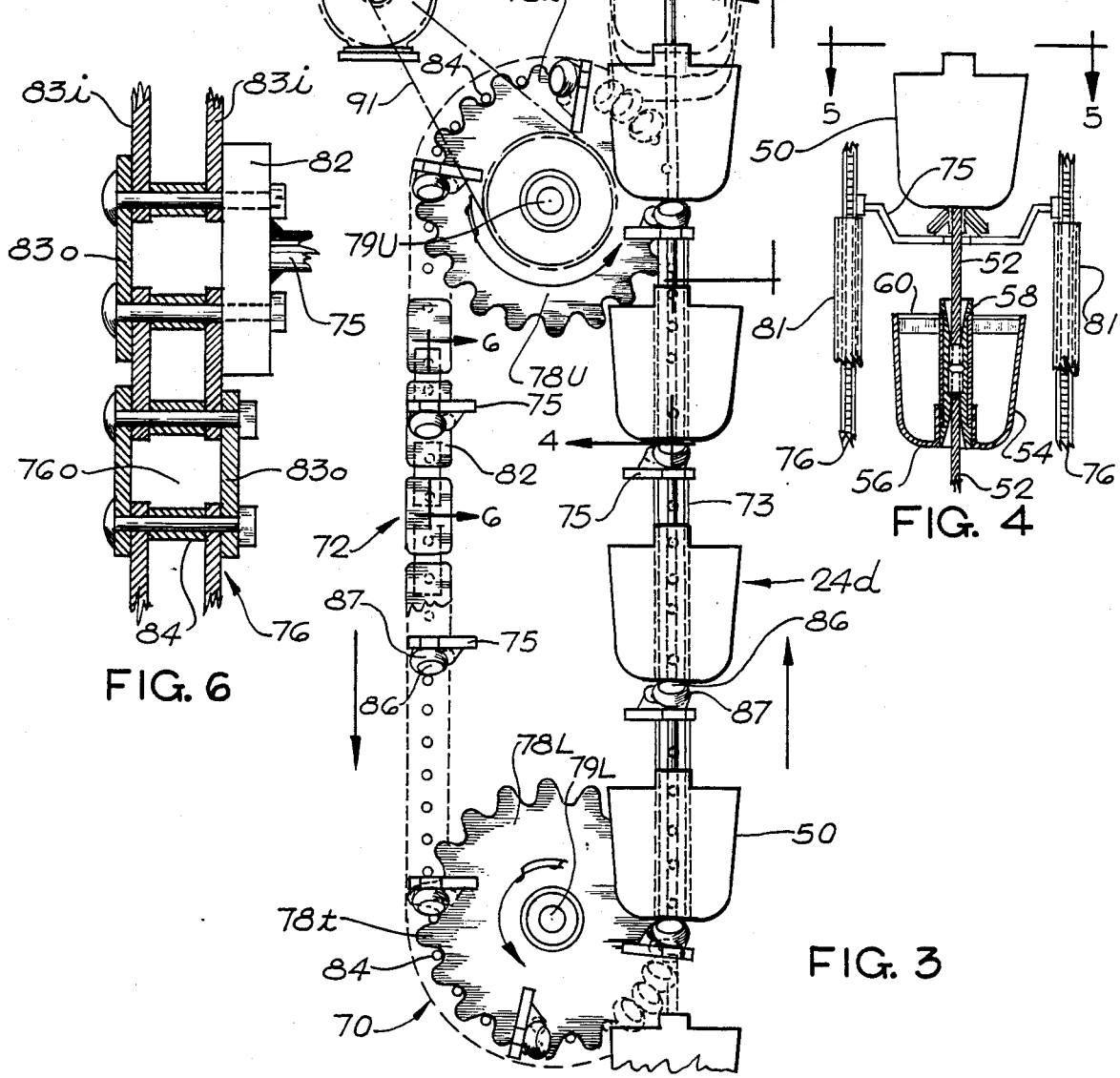

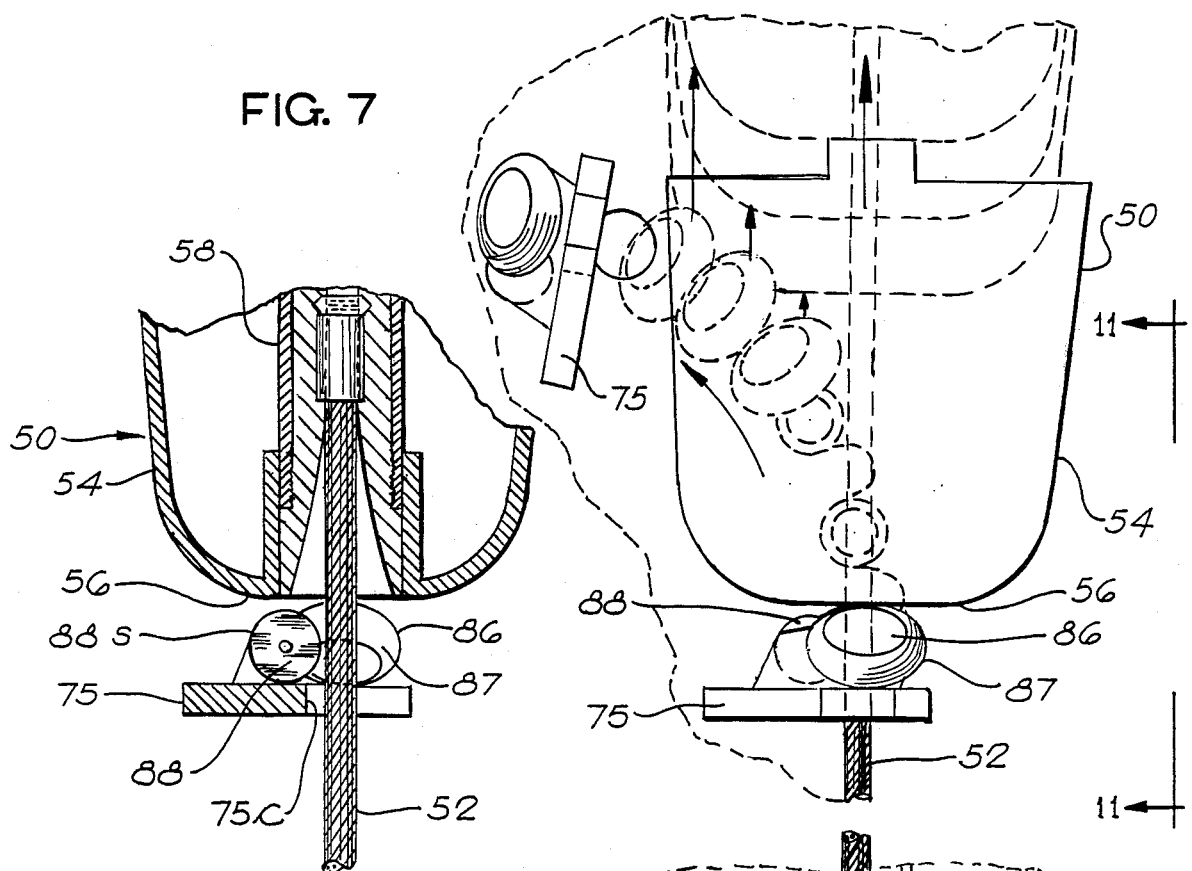
FIG. 7
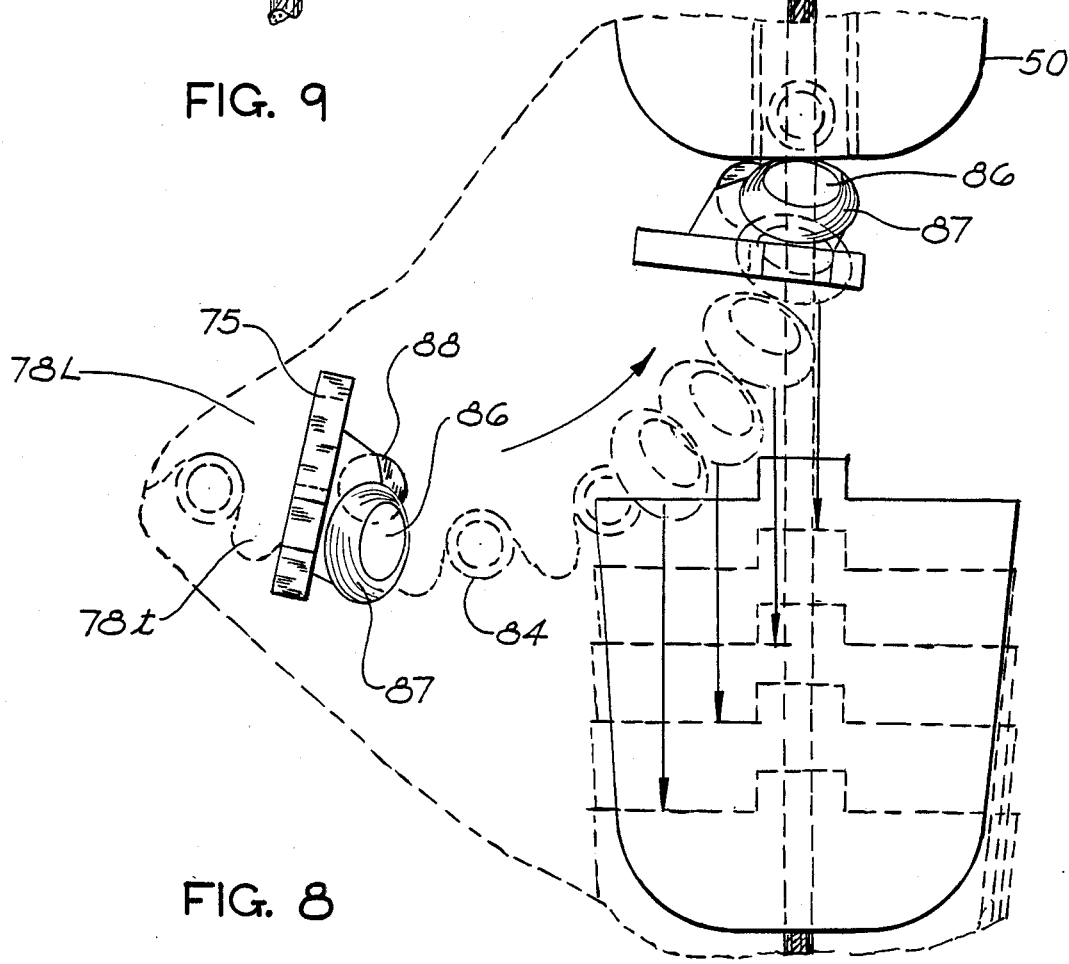
FIG. 9
FIG. 8

BULK MATERIALS HANDLING MACHINE HAVING A TRACTOR DRIVE

This application is a continuation of the applicant's copending application, Ser. No. 838349, filed Mar. 11, 1986, now abandoned.

FIELD OF THE INVENTION

This invention relates to a bulk materials handling machine of the type having an endless bucket train comprising many axially spaced buckets which are axially connected by flexible tension elements, such as wire rope or cable means. The bucket train is adapted to ride around spaced support wheels. In one form of materials handling machine, the bucket train is freely suspended between a pair of successive wheels, to form a loading span, including an intermediate section which is dragged through and picks up the underlying loose bulk material. Such span also includes two end sections, each hanving along a catenary curve between the underlying material and the adjacent wheel.

This invention especially relates to a machine having a new and improved drive mechanism for circulating the bucket train around the wheels and through the material, and for lifting the filled buckets. The drive mechanism of the present invention employs endless loop tractor drive means having a driving leg which parallels an ascending portion of the bucket train and simultaneously engages and pushes a plurality of the spaced buckets along such portion. The tractor drive loop mechanism of this invention is capable of lifting large numbers of buckets from a correspondingly long loading span, even with large buckets and dense material, and with the bucket train moving at a high speed, to yield a high tonnage per hour capacity for the machine, while reducing and minimizing the incidence of wire rope breakage and other forms of wear and tear on the machine, to afford a long and trouble-free service life.

BACKGROUND OF THE INVENTION

In certain aspects, the present invention represents improvements over the bulk materials handling machines disclosed and claimed in the present applicant's U.S. Pat. Nos. 3,378,130, issued Apr. 16, 1968, and No. 3,688,893, issued Sept. 5, 1972. The present invention also represents improvements over the machine disclosed in U.S. Pat. No. 4,264,003, issued Apr. 28, 1981 to Charles B. Gill. The bulk materials handled by such machines may include granular materials, powders, flakes, chips or the like.

These bulk materials handling machines utilize an endless bucket train comprising many axially spaced circular buckets connected together by flexible tension elements, such as cable means. The bucket train is supported and driven by a series of wheels to define separated loading and unloading spans of buckets.

The loading span is defined by two such wheels, horizontally spaced apart and disposed above the loose bulk material that is to be dug and conveyed by the materials handling machine. Initially, in the free state, the bucket train in the loading span is freely suspended along a catenary curve between the two wheels. However, when the machine is in use, the loading span is brought into digging engagement with a pile or mass of the loose bulk material. In this situation, an intermediate section of the loading span engages the bulk material and is deflected upwardly from the catenary curve. As the bucket train is circulated, the initial or downward section of the loading span is moved with empty buckets from the first of the wheels to the bulk material, the intermediate section of the loading span is dragged through the material to fill the buckets, and the other end section of the loading span is moved with filled buckets upwardly from the material and toward the unloading span.

The unloading span of the bucket train may be elevated above the loose material and located downstream therefrom, relative to the direction of movement of the bucket train, and operates to dump the material from the buckets, as, for example, into a hopper or onto a take-away conveyor. In one advantageous arrangement of the unloading span, the bucket train travels over a first wheel and under the next wheel, which is located lower than the first wheel, whereby the buckets are inverted between these wheels, so as to dump the material from the buckets.

Each bucket may have a circular cross section and may include a central tubular mounting core. The tension elements may be made of flexible wire rope or cable and may extend into the mounting cores at both ends of the buckets, which may be secured to the tension element means at generally equal axial spacings therealong. The bucket train is adapted to ride around on the periphery of each conveyor wheel.

Each wheel may have spaced guides to receive and laterally hold the cable means between each pair of adjacent buckets. Each bucket fits between each pair of adjacent guides. Drive rollers or other means are mounted on the periphery of each wheel, for meshing with the bucket train, between the spaced buckets, so as to keep the movements of the bucket train and wheel synchronized. One or more of the wheels typically are rotated under power, to circulate the bucket train, while the remaining wheels are idler wheels, rotated by the moving bucket train. As to the power driven wheels, the drive rollers engage a rounded bottom portion of each bucket, to drive the bucket train. As to the idler rollers, the drive rollers are engaged by the core at the top end of each bucket, so that the wheel is driven by the bucket train. Additional rollers or other supports may also be provided on the periphery of each wheel, to engage and stabilize the buckets as they are carried around on the wheel.

To recapitulate, the buckets are held in place on each wheel by the support rollers, engaging the sides of the buckets, by the drive rollers, engaging the bottoms or tops of the buckets, and by the cable guides, on which the cables or tension elements are trained.

In the typical bulk materials handling machine as described, the cable or wire rope sections, extending between the buckets, must support the total weight of the suspended filled buckets of the loading span. An additional significant load can be imposed on the cable sections because of the buckets digging through the bulk material. Centrifugal forces tending to whip the buckets out from the wheels are also generated, and must be resisted by the cable sections. Moreover, the cable sections are repeatedly flexed as they move over each support wheel and assumes its curvature. These stresses of course set the minimum design specifications for the cable or wire rope sections.

For a high payload capacity machine, the buckets are made large, thus imposing very large loads on the cables. Moreover, the bucket train may also be operated at a high speed, so that the cables are subjected to severe flexure and vibration under heavy loads. Field experience with such bulk materials handling machines indicates that cable maintenance and failure constitute the most common cause for machine downtime. The repeated flexure of the cables, proximate the buckets, the abrasion of the cables against the cable guides, as the cables travel around on the support wheels, and the high cable loads and stresses are all believed to be contributing causes for cable failures. Even with optimim cable design, combining high strength and high flexibility, there has been and unexpectedly high incidence of cable damage, such as fraying, and actual cable failure.

OBJECTS OF THE INVENTION

One principal object of the present invention is to provide a new and improved bulk materials handling machine of the foregoing character, including a new and improved drive mechanism for engaging and circulating the bucket train in such a manner as to produce a high load carrying capacity, in terms of tonnage per hour, while also reducing the stresses on the bucket train, particularly the stresses on the cables or other tension elements extending between the buckets, so as to reduce the incidence of wear and failure of the tension elements and other bucket train components.

Another object is to provide a new and improved machine in which the drive mechanism directly engages the loaded buckets, independently of the support wheels, as the loaded buckets travel along an ascending path, after the buckets have been filled with the bulk material, so as to reduce the loads imposed on the cables or other tension elements, as the cables are flexed by passage of the bucket train around the support wheels, particularly the support wheel over which the bucket train passes after traveling upwardly with loaded buckets along its ascending path, whereby the combination of high stresses and high flexure of the cables is avoided, so as to reduce the wear and failure of the cables.

A further object is to provide a new and improved machine in which the drive mechanism engages and lifts a plurality of the buckets simultaneously, as the loaded buckets travel upwardly along a substantially straight ascending path, so that the loading produced by the drive mechanism is spread out and shared among a plurality of the buckets and a plurality of the cables or other tension elements extending therebetween, at positions where the cables are substantially straight and are not being subjected to substantial flexure.

Yet another object of the invention is to provide a new and improved machine in which the drive mechanism includes endless loop means forming a tractor drive having spaced pushers thereon which mesh with the bucket train and engage the buckets along a driving leg of the tractor drive, as the loaded buckets travel along their ascending path, substantially parallel with the driving leg, so that several of the buckets are simultaneously engaged and propelled by the pushers, thereby spreading out the distributing the stresses imposed upon the individual buckets and the individual cables or other tension elements extending therebetween.

A more specific object of the invention is to provide anti-friction rollers or other means on the pushers for engaging the buckets, the cables or both, for minimizing friction and abrasion as the pushers are moved into and out of driving engagement with the buckets.

SUMMARY OF THE INVENTION

To achieve these and other objects, the present invention may provide a materials handling machine for moving loose bulk material from an underlying pile, comprising an endless bucket train, formed of a plurality of flexible and nonextendable tension element means, a corresponding plurality of buckets, and means securing the buckets on the tension element means at generally equal axial spacings from one another; and means including a plurality of support wheels for directing the bucket train to define between certain of the wheels a loading span adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material; drive means to circulate the bucket train unidirectionally around an endless path on the wheels, said drive means being spaced above the pile of the loose bulk material and being disposed along the ascending path of the bucket train where the filled buckets are being moved upwardly; said drive means including elongated endless loop means having a plurality of pushers thereon at equal spacings around the loop means and generally corresponding to the axial spacings of the buckets on the bucket train, the loop means having a driving leg extending alongside the ascending path of the bucket train; the pushers on the driving leg of the loop means being disposed to mesh with the bucket train and to engage the bottoms of corresponding buckets as they travel along the ascending path of the bucket train; and power means operable for circulating the endless loop means to cause the pushers in engaging the buckets to lift the filled buckets and to circulate the bucket train around its endless path on the wheels.

The driving leg of the loop means is preferably elongated sufficiently relative to the spacing of the pushers from one another to provide a plurality of pushers meshing with the bucket train and in driving engagement with a plurality of the buckets, whereby the driving load is shared by a plurality of the pushers and a plurality of the buckets, to reduce the stresses on the buckets and on the wire rope, cables or other tension elements extending between the buckets.

The machine preferably includes guide means along the driving leg of the loop means for stabilizing the positions and orientation of the pushers relative to the bucket train.

Anti-friction rollers are preferably mounted on each of the pushers for engagement with the tension elements to minimize friction and abrasion between each pusher and the tension elements.

Anti-friction rollers are also preferably carried on the pushers for engagement with the buckets to minimize abrasion and friction between the pushers and the buckets. Preferably, each pusher is provided with two anti-friction drive rollers which are symmetrically mounted on opposite sides of the tension elements, for driving engagement with the buckets.

Such drive rollers are preferably mounted on the pushers for rotation about axes extending at acute angles relative to the direction of movement of the bucket train. The drive rollers preferably have conically tapered peripheral surfaces extending at approximately forty-five degrees relative to the axes of rotation, for driving engagement with the buckets.

The loop means may comprise a pair of endless drive chains extending alongside the ascending leg of the bucket train on opposite sides thereof, and drive sprockets around which the drive chains are trained. The pushers are preferably connected between the drive chains so as to extend transversely to the bucket train.

Preferably, the machine includes longitudinal guide members for guiding the movement of the drive chains alongside the bucket train to stabilize the positions and orientation of the pushers relative to the bucket train. The guide members preferably include inner and outer guide walls disposed along the inner and outer sides of the drive chains along the driving leg of the loop means where the pushers are meshing with the bucket train for engaging and driving the buckets, whereby the pushers are accurately positioned and oriented relative to the buckets.

The ascending path of the bucket train is substantially straight where the pushers engage and lift the buckets, so that the cables or other tension elements are not flexed at the locations where tensile stresses are developed in the tension elements by the driving effort of the pushers. The drive chains are preferably located close to one of the wheels over which the bucket train travels to begin the inversion and dumping of the buckets.

BRIEF DESCRIPTION OF THE DRAWINGS

Further objects, advantages and features of the present invention will appear from the following description, taken with the accompanying drawings, in which:

FIG. 3 is an enlarged fragmentary elevational view, similar to a portion of FIG. 1, showing additional details of the drive mechanism for the bucket train employed in the materials handling machine of FIG. 1.

FIG. 4 is a fragmentary sectional view, taken generally along the line 4—4 in FIG. 3.

FIG. 5 is a fragmentary sectional view, taken generally along the line 5—5 in FIG. 4.

FIG. 6 is an enlarged fragmentary sectional view, taken generally along the line 6—6 in FIG. 5.

FIGS. 7 and 8 are enlarged fragmentary elevational views, similar to portions of FIG. 3, at the upper and lower drive sprockets of the drive mechanism, illustrating additional details of the components, while also showing the components in various sequential positions of operation.

FIG. 9 is a fragmentary view similar to a portion of FIG. 7, but showing one of the pushers in section.

DETAILED DESCRIPTION OF A PREFERRED EMBODIMENT OF THE INVENTION

Figure 2:
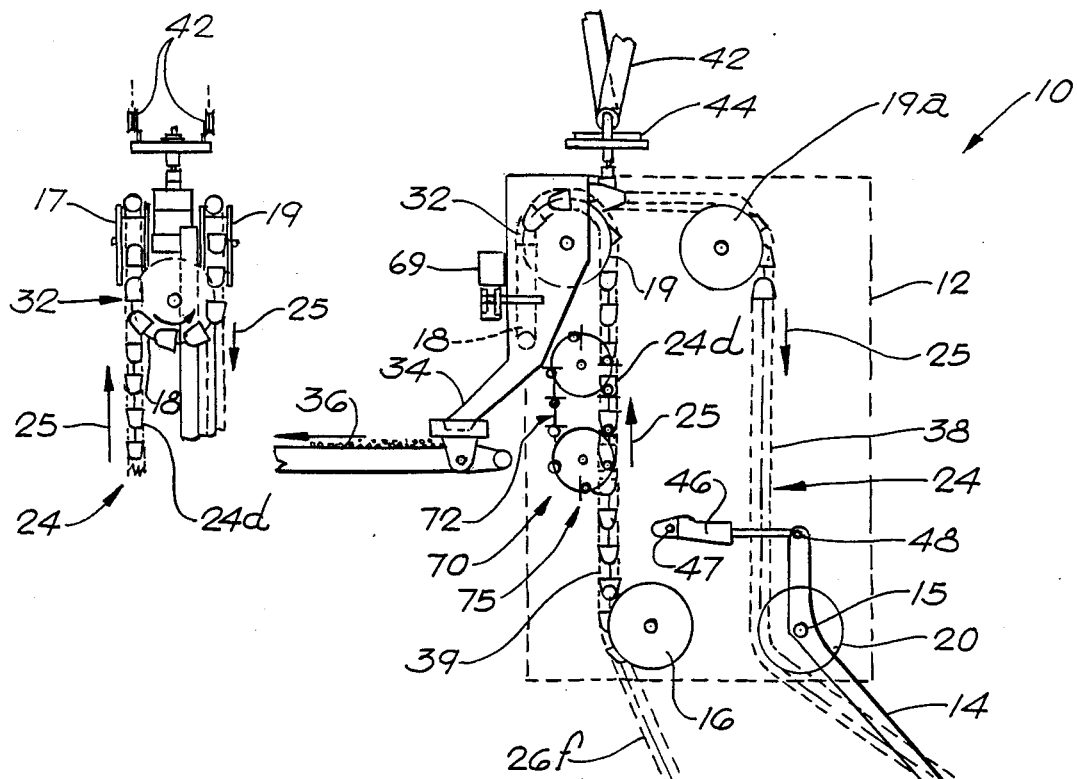
FIG. 2 is a left-side elevational view of a portion of the materials handling machine illustrated in FIG. 1.
Figure 1:
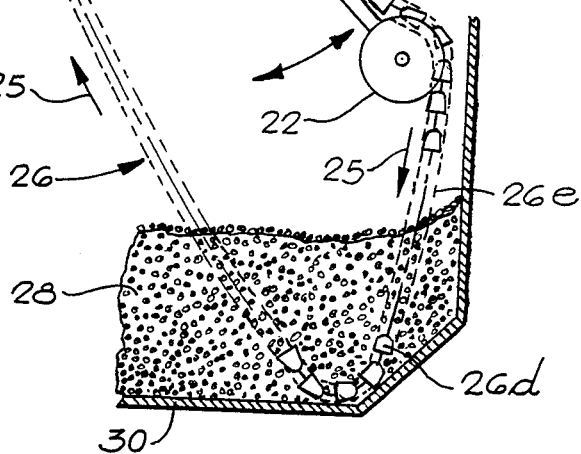
FIG. 1 is a diagrammatic elevational sectional view showing a bulk materials handling machine to be described as an illustrative embodiment of the present invention.
Figure 10:
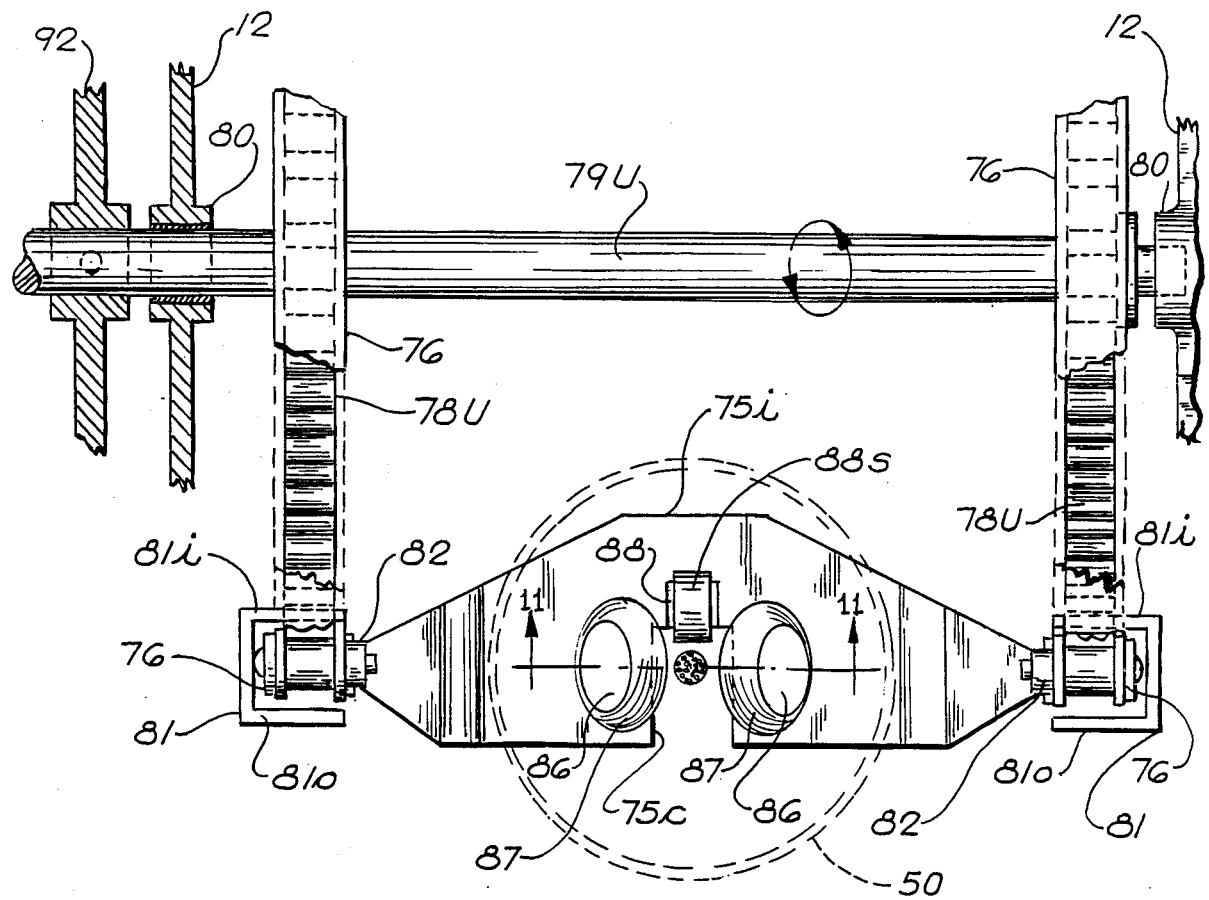
FIG. 10 is an enlarged fragmentary sectional view, similar to a portion of FIG. 5.
Figure 11:
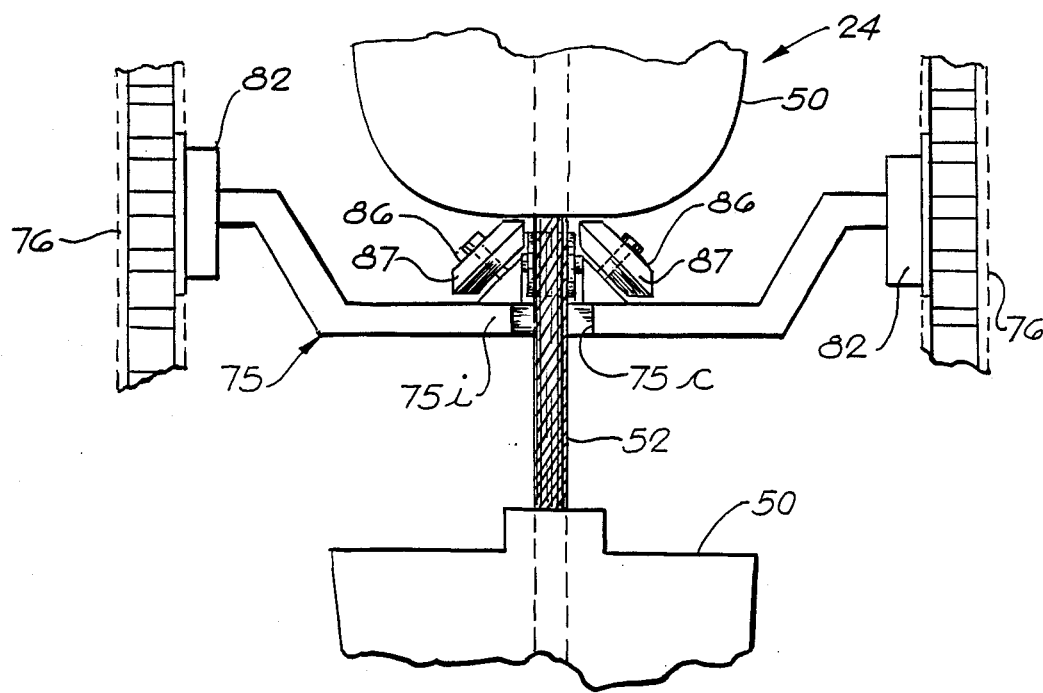
FIG. 11 is a fragmentary elevational view, taken generally as indicated by the line 11—11 in FIG. 7.

FIG. 1 illustrates somewhat schematically a bulk materials handling machine 10 of the type disclosed in the aforementioned U.S. Pat. Nos. 3,378,130; 3,688,893 and 4,264,003. The bulk materials handling machine 10 typically includes a frame or housing 12; a boom 14 swingably pivoted at 15 to the frame 12; a plurality of support wheels 16, 17, 18, 19, 19a and 20 journaled to the frame 12; a support wheel 22 journaled to the boom 14; and a flexible endless bucket train 24 passing over or under the support wheels, so as to be carried in a configuration as shown, and circulated in the direction indicated by the arrows 25. The bucket train 24 is freely suspended along a relatively long loading span 26 between the wheels 22 and 16, and is intended to be dragged through the underlying bulk material 28 confined in a barge or ship 30, or some other container, to pick up the material. The bucket train 24 is also guided around the wheels 17, 18 and 19 which define unloading span 32 where the material is intended to be dumped from the bucket train. A hopper 34 is located around and under the unloading span 32 of the bucket train 24 to receive the material dumped therefrom. As shown, a belt conveyor 36 receives the material from the hopper 34 and carries the material to some remote location.

The illustration of FIG. 1 is somewhat schematic, and the construction shown therein is subject to various modifications. For example, the support wheel 19a could be eliminated, and downwardly moving section or flight 38 of the bucket train 24 could travel directly between the wheels 19 and 20. The wheel 20 could be located closer to the wheel 16, so that the downwardly moving flight 38 would be closer to the upwardly moving flight 39 of the bucket train 24 between the wheels 16 and 17. The flights 38 and 39 could remain parallel or nearly so.

In FIG. 1, the housing or frame 12 of the machine 10 is suspended from an overlying cable connection 42. A swivel mechanism 44 is located between the housing 12 and the cable connection 42 to allow the entire machine to be rotated about the vertical axis of the swivel mechanism 44. The hopper 34 could be modified to incorporate a further swivel connection, as illustrated and described in the aforementioned U.S. Pat. No. 4,264,003.

A power cylinder 46, connected between the frame 12 at 47 and the boom 14 and 48, is employed to vary the boom angle, so as to change the position of the boom wheel 22 relative to the underlying bulk material 28, as well as to vary the lateral protrusion of the boom 14. While the disclosed materials handling machine 10 may have many uses, it is particularly useful for unloading a ship or barge, shown schematically at 30. For such use, the machine is lowered so that the boom 14 and the lower portion of the machine pass through a hatch opening (not shown) into the hull of the ship or barge 30. To clear the hatch opening, the boom 14 may be swung upwardly or downwardly, as needed. The boom 14 may then be swung outwardly to deploy the loading span 26 of the bucket train 24. The swivel mechanism 44 allows the boom 32 to be swung horizontally around a full circle over the bulk materials underneath, so that the loading span 26 provides wide coverage over the material. The machine 10 is dimensioned and positioned so that the loading span 26 reaches the bottom of the ship or barge 30.

The bucket train 24 is illustrated in greater detail in FIGS. 3 and 4. The train 24 has many separate buckets 50 that are connected together at uniform spacings by flexible nonextendable tension element means 52. Each bucket 50 is circular in cross section, with an annular side wall 54 and a rounded transverse bottom wall 56. Each bucket 50 has a central tubular core 58 welded or otherwise secured to the bottom wall 56. Radial bars 60 extend from the nose portion of the core 58 to the lip portion of the side wall 54. The tension element means 52 could be continuous but are illustrated as short tension elements, extending between the adjacent buckets 50. The tension elements 52 preferably take the form of short lengths of wire rope or cables but might be in the form of other flexible tensile materials, such as chains, for example. The illustrated wire ropes or cables 52 are removably anchored to the buckets 50, within the core portions 58. The overall length of the bucket train 24 can be increased or decreased, as needed, by adding or removing the appropriate number of buckets 50 and cables 52. The construction of the bucket train 24 may be the same as disclosed in the Wallace U.S. Pat. No. 3,688,893.

Each bucket train support wheel is mounted to rotate about a generally horizontal axis. Although only the wheel 17 is illustrated in FIG. 3, all of the wheels may be of substantially the same construction. The wheel 17 has a generally cylindrical wall 62 supported annularly of a central bearing mount 64. A plurality of radial arms 66 project from the wall 62 at equal circumferential spacings from one another, corresponding approximately to the axial separation of the buckets 50 on the bucket train 24. The buckets 50 are adapted to fit between adjacent pairs of the arms 66, while the cables 52 are adapted to curve over the ends of the adjacent radial arms 66. A peripheral groove or guide (not shown) is formed in each arm to receive the cables 52 and to hold them against movement laterally of the radial plane defined by the cables 52 as curved around on the wheel. Such grooves are disclosed in the Wallace U.S. Pat. No. 3,688,893. Support rollers 67 are mounted on the cylindrical wall 62, between each pair of arms 66, to underlie and engage each bucket 50 carried around on the wheel. As shown, the rollers 67 are arranged in pairs, equally spaced from and on opposite lateral sides of the radial plane defined by the curved cable elements 52. The rollers 67 are operative to support each bucket 50 laterally and at a radial location where the cable elements 52 are curved at a substantially uniform radius around the wheel.

Drive rollers 68 are provided on each arm 66, adapted to mesh with the bucket train and to engage each bucket 50 so that the rotation of the support wheels will be synchronized with the circulation of the bucket train 24. There is a driving relation between the drive rollers 68 and the buckets 50, both for the situation in which the support wheel is power driven and is adapted to drive the bucket train 24, and for the situation in which the wheel is an idler wheel and is caused to rotate by the movement of the bucket train 24, passing around the wheel.

FIG. 1 illustrates a power operated drive motor 69 for rotation the support wheel 18. The motor 69 may be operated hydraulically, electrically, or otherwise. Prior to the present invention, having a power driven support wheel has been the sole and typical means for driving the bucket train 24. When the support wheel is driving the bucket train 24, as in the case of the support wheel 18, the leading drive rollers 68L engage the rounded bottom wall 56 of each successive bucket 50, to drive the bucket train 24. When the support wheel is not power driven, but is an idler wheel, as in the case of the other support wheels shown in FIG. 1, the core portion 58 of each bucket 50 engages the successive trailing drive rollers 68T to drive the wheel.

As illustrated in FIG. 3, the drive rollers 68 are arranged in clusters of four of the rollers 68 on each radial arm 66. The rotary axes of the drive rollers 68 are angled at an acute angle of substantially forty-five degrees relative to the radial plane of the support wheel. The drive rollers 68 are symmetrically disposed, so that the axes of adjacent rollers are oppositely angled. The drive rollers 68 have conically tapered peripheral surfaces 69 angled at substantially forty-five degrees from their axes of rotation.

Each of the buckets 50 is engaged by two of the drive rollers 68 of each cluster, on opposite sides of the cable elements 52, which are guided between the drive rollers 68 on opposite sides of the cable elements.

The bucket train 24 and the individual support wheels 15–22, as thus far described, are essentially the same as described and illustrated in the Wallace U.S. Pat. No. 3,688,893. Other details of the materials handling machine 10 are similar to the corresponding details, as described and illustrated in such Wallace patent, as will be evident.

The endless bucket train 24 is trained around the upper sides of the boom wheel 22 and the frame wheels 17, 19 and 19a, while being trained around the lower sides of the frame wheels 16, 18 and 20. The previously mentioned loading span 26 of the bucket train 24 is freely suspended between the wheels 22 and 16. When the loading span 26 is out of contact with the bulk material, the loading span is suspended along a catenary curve. When the machine 10 is maneuvered so that the loading span 26 engages the bulk material 28, the loading span 26 has an intermediate section 26d which rests upon or digs into the bulk material. Between the boom wheel 22 and the bulk material, the loading span has a downwardly traveling section 26e which hangs along a catenary curve. The buckets 50 are empty along the section 26e. Between the bulk material 28 and the wheel 16, the loading span 26 has an upwardly traveling section 26f which hangs along a catenary curve. Along the section 26f, the buckets 50 are full of the bulk material, which was dug by the buckets along the intermediate section 26d.

After the buckets 50 have been filled with the bulk material, the bucket train travels along an upwardly ascending path, which includes the upwardly extending portion 26f of the loading span 26, as well as the upwardly extending span 39 of the bucket train 24, between the wheels 16 and 17.

It should be noted that the endless bucket train 24, as trained around the various support wheels 16–22, is subjected to many gravitational and dynamic forces and stresses. The cables or other tension elements 52 must support the total weight of the suspended filled buckets, while also being subjected to significant additional dynamic forces caused by the digging action of the buckets, as they are dragged through the bulk material. Moreover, the flexure of the cable elements 52 produces additional stresses therein, particularly the flexure which is produced by the movement of the filled buckets around the dumping support wheel 17 and the movement of the buckets around the driving wheel 18. Thus, the cable elements 52 are most severely stressed as they approach the support wheel 17 and as they travel around the wheels 17 and 18, along the unloading span 32. The combination of high tensile stresses and high flexure stresses in the cable elements 52 tends to cause accelerated wear on the cable elements. The engagement of the cable elements with the supporting arms 66 on the wheels 17 and 18 is also a factor in such accelerated wear.

In actual operating tests, there has been an unexpectedly high incidence of such accelerated wear of the cable elements, leading to eventual fraying and actual failure of the cable elements. This has been true, even with optimum design of the cable elements, combining high tensile strength with high flexibility.

This invention provides an improved driving arrangement for circulating the bucket train 24, around the support wheels and through the bulk material 28, and particularly for lifting the filled buckets as they travel along their ascending path, afforded by the ascending spans 26f and 39, so as to bring about a significant reduction in the critical stresses imposed upon the cable elements 52. In this way, the anticipated service life of the bucket train 24 is significantly extended. A power operated, endless loop tractor drive mechanism 70 is provided, having endless loop means 72 with a driving leg 73 extending parallel with and alongside an ascending section 24d of the bucket train 24. Pushers 75 are carried on the endless loop means 72, to mesh with the bucket train 24 and to engage and lift a plurality of the buckets 50, as they travel upwardly along their ascending path toward the support wheel 17. The tractor drive mechanism 70 is capable of maintaining or increasing the materials handling capacity of the machine 10, while reducing the stresses imposed upon the cables or other tension elements 52, so as to avoid failure of the cables, thereby increasing the service life of the cables.

The endless loop means 72 preferably may be formed by two parallel endless drive chains 76, extending along opposite sides of the bucket train 24. The drive chains 76 are trained around upper and lower drive sprockets 78U and 78L, secured to upper and lower rotatable shafts 79U and 79L, journaled in bearings 80 which may be mounted on portions of the frame or housing 12. U-shaped guide channels 81 are positioned with their inner and outer walls 81i and 81o adjacent the inner and outer sides of the drive chains 76. The guide channels extend along and parallel with the ascending section 26d of the bucket train 24, and are operative to guide and stabilize the drive chains 76, so that they travel along straight paths, as they traverse the driving leg 73 of the loop means 72. The pushers 75 are connected at their opposite ends to the spaced parallel drive chains 76. Thus, as shown in FIG. 6, the pushers 75 are secured to special links 82 of the chains 76. Otherwise, the drive chains 76 may be conventional roller chains, having a series of inner and outer links 83i and 83o, rollers 84, and link pins 85. The sprockets 78U and 78L may have teeth 78t which mesh with the openings 76o formed by the links of the chains.

The pushers 75 are illustrated as rigid bars, extending transversely between the drive chains 76, and preferably at right angles to the drive chains 76 and the bucket train 24. Each pusher 75 has a widened-out intermediate portion 75i, adapted to mesh with the bucket train 24 and to underlie the buckets 50. The intermediate portion 75i of each pusher is offset in a trailing relation, relative to the end portions of the pusher 75. The intermediate portion 75i has a cutout or notch 75c for receiving the cable elements 52 with ample side clearance.

Anti-friction drive rollers 86 are rotatably mounted on the intermediate portion 75i of each pusher 75, for driving engagement with the rounded bottoms of the buckets 50, on opposite sides of the cable elements 52. As shown, each pusher 75 has two such drive rollers 76, but the number and arrangement of the drive rollers can be varied. The illustrated drive rollers 86 are adapted to engage the buckets 50 symmetrically, relative to the cable elements 52. The drive rollers 86 are similar to the drive rollers 68, in that the drive rollers 86 are rotatable about axes extending at acute angles of substantially forty-five degrees to the axial direction of the cable elements 52. The drive rollers 86 have conically tapered peripheral surfaces, angled at substantially forty-five degrees to their axes of rotation. The peripheral surfaces 87, when adjacent the bottom walls 86 of the buckets 50, thus extend parallel with the bottom walls, for optimum driving engagement therewith.

An additional anti-friction roller 88 is rotatably mounted on each pusher 75, at a location between the drive rollers 86, for engaging the cable elements 52, which are also confined between the drive rollers 86. The roller 88 projects into an overlapping relationship with the cutout 75c in the pusher 75, so that the roller 88 engages the cable elements 52 before they can engage the end wall of the cutout. The roller 88 is rotatable about an axis at right angles to the axis of the cable elements 52, and has a generally cylindrical peripheral surface 88s, opposite the cable elements, for rolling engagement therewith. The anti-friction rollers 86 and 88 are engageable with the cable elements 52, to prevent the cable elements from engaging the intermediate portions 75i of the pushers 75. If desired, each roller 88 can be formed with a peripheral groove for engaging the cable elements 52 with a self-centering action.

The rollers 86 and 88 act as anti-friction means which enable the pushers 75 to move smoothly and easily into and out of mesh with the bucket train 24, while minimizing friction and abrasion between the pushers and the bucket train.

The pushers 75 are connected to the separate drive chains 76 at equal spacings or intervals around the loop means 72. Such spacings are substantially the same as the spacings or intervals between the successive buckets 50 of the bucket train 24. Preferably, the driving leg 73 of the loop means 72 is sufficiently long, relative to the spacing between the pushers 75, to insure that two or more of the pushers 75 are simultaneously meshing with the bucket train 24, so that two or more of the pushers are exerting driving forces on the successive buckets 50 at all times. In this way, the total driving effort exerted by the pushers 75 of the drive mechanism 70 is spread among and shared by two or more of the successive buckets 50, so that the maximum stresses upon the buckets and the cable elements 52 are reduced. Thus, the wear and tear on the buckets and the cable elements are reduced, so that the service life of the bucket train 24 is prolonged.

The tractor drive mechanism 70 is power driven by suitable means, such as the illustrated motor 90, mounted on the frame or housing 12, with a suitable driving connection, such as the illustrated train drive 91, trained around a driving sprocket 91a on the motor 90 and a driven sprocket 92, secured to the upper sprocket shaft 79U. The motor 90 may be operated electrically, hydraulically or otherwise.

The endless loop tractor drive mechanism 70 is located along the ascending path or leg of the bucket train, where the filled buckets are being lifted upwardly, after being filled along the loading span 26. The drive mechanism 70 could be located along the ascending portion of the loading span, but is illustrated as being located along the upper portion of the vertical span 39, along which the filled buckets travel upwardly from the loading span 26, between the wheels 16 and 16. The tractor drive mechanism 70 is preferably located close to the support wheel 17, around which the buckets travel to the unloading span 32. At this location, close to the support wheel 17, the maximum number of the filled buckets 50 are suspended below the drive mechanism 70. The pushers 75 of the drive mechanism 70 exert most of the driving effort to lift the filled buckets, so that the stresses in the cable elements 52 are greatly reduced before the cable elements are flexed to travel around the support wheel 17. Thus, the combination of high tensile stress and high flexure in the cable elements 52 is avoided. Moreover, the sharing of the driving load by two or more pushers and two or more buckets reduces the maximum tensile stress in the cable elements 52.

The pushers 75 of the tractor drive mechanism 70 exert their driving forces on two or more successive buckets, while the buckets are traveling along the substantially straight leg 24d of the bucket train. Thus, the driving effort is not combined with any flexure of the cable elements 52.

The drive chains 76 are guided along straight paths by the guide channels 81, which stabilize the movement of the chains 76, while also stabilizing the positions and orientation of the pushers 75. In this way, the pushers 75 are caused to travel upwardly with the desired spacing and orientation, so as to mesh smoothly with the bucket train 24.

In the illustrated materials handling machine 10, the tractor drive mechanism 70 exerts most of the lifting effort on the bucket train 24, before the bucket train reaches the support wheel 17, but the next support wheel 18 is still power driven, to assist in circulating the bucket train 24. However, the amount of driving power supplied to the support wheel 18 is greatly reduced. Accordingly, the amount of tension in the cable elements 52 is greatly reduced as the cable elements are flexed in their passage around the support wheels 17, 18 and 19.

Most of the driving effort is exerted upon the bucket train 24 by the tractor drive mechanism 70. Consequently, the operating speed of the tractor drive mechanism 70 basically establishes the operating speed of the bucket train 24. The drive motor 69 for the driven support wheel 18 is adjusted to develop the desired amount of additional driving effort at the operating speed established by the tractor drive mechanism 70. Thus, the drive motor 69 is of a variable speed, variable torque type. If desired, some support wheel other than the wheel 18 may be driven. It is also possible to drive two or more of the support wheels. As another alternative, all of the power for circulating the bucket train 24 may be supplied by the tractor drive mechanism 70. The weight of the empty buckets traveling downwardly from the support wheels 19a, 20 and 22 is sufficient to propel the bucket train around the wheels 17, 18, 19a, 20 and 22.

FIGS. 7 and 8 show the manner in which the tractor drive pushers 75, with the drive rollers 86 mounted thereon, move into and out of mesh with the bucket train 24. Successive phantom positions of the pushers 75 and the drive rollers 86 are shown, along with corresponding successive phantom positions of the buckets 50.

SUMMARY OF THE OPERATION

During operation of the materials handling machine 10, the endless bucket train 24 is circulated continuously around the support wheels. The empty buckets 50 travel over the wheels 19 and 19a, under the wheel 20, and over the boom wheel 22. Between the boom wheel 22 and the wheel 16, the bucket train 24 is suspended to form a loading span 26 which is generally in the form of a catenary curve, modified by the contact of the bucket train with the loose bulk material 28. From the boom wheel 22, the bucket train 24 travels downwardly, with empty buckets 50, to the bulk material 28. The buckets 50 are then dragged along and through the bulk material 28, so that they dig into and are filled with the bulk material, along the intermediate or digging section 26d of the loading span 26. After clearing the bulk material 28, the filled buckets 50 travel upwardly along the remaining or ascending portion 26f of the loading span 26.

The bucket train 24 then travels under the wheel 16 and upwardly along the ascending span or path 39 to the support wheel 17. Along the ascending span 29, the bucket train 24 is driven by the endless loop tractor drive mechanism 70, which provides most of the driving effort for lifting the filled buckets 50 and dragging the buckets through the bulk material 28. The pushers 75 on the endless loop tractor drive mechanism 70 mesh with the bucket train so that two or more of the pushers are simultaneously applying lifting forces to successive buckets 50, at all times. The bucket train 24 is traveling along the straight section or leg 24d, so that the lifting forces are applied to the buckets 50 without any flexure of the interconnecting cable elements 52, extending between the buckets 50. Thus, the combination of high stresses and high flexure in the cable elements 52 is avoided. The total lifting effort of the pushers 75 is distributed among and shared by two or more of the buckets, so that the maximum loading of the cable elements is reduced, relative to the total lifting effort.

From the tractor drive mechanism 70 the bucket train travels upwardly a short distance to the support wheel 17, and then over the support wheel 17 and downwardly to the support wheel 18 along the unloading span 32, where the buckets are inverted, so that the bulk material is dumped from the buckets into the discharge hopper 34. As the bucket train passes over the support wheel 17, under the driven wheel 18 and over the wheel 19, the cable elements 52 are flexed, in accordance with the peripheral curvature of the wheels, but the stresses in the cable elements are low, because almost all of the driving effort has already been exerted upon the bucket train 24 by the pushers 75 of the endless loop tractor drive mechanism 70. The driving power, supplied by the drive motor 69 to the driven wheel 18, is greatly reduced, compared with the situation which existed in prior machines, lacking the endless loop tractor drive mechanism 70.

In the materials handling machine 10, embodying the present invention, the maximum tensile stress in the cable elements 52 occurs just below the endless loop tractor drive mechanism 70, where the cable elements 52 are not being flexed at all. The maximum flexure of the cable elements 52 occurs as the bucket train 24 travels around the support wheels 17 and 18, where the tensile stresses in the cable elements 52 are low, because almost all of the lifting effort has already been exerted on the cable elements by the endless loop tractor drive mechanism 70. Accordingly, the present invention avoids the combination of high tensile stresses and high flexure in the cable elements 52. As a result, the wear and tear on the cable elements 52 is greatly reduced, compared with prior machines, lacking the endless loop tractor drive mechanism 70. Thus, the service life of the cable elements is greatly prolonged. Fraying and breakage of the cable elements is no longer a problem. Wear and tear on the buckets and support wheels is also reduced.

The tractor drive mechanism should mesh with the bucket train along the ascending path of the filled buckets, but the ascending path does not have to be strictly vertical. Moreover, the specific arrangement of the support wheels may be varied.

In addition, the driven leg of the bucket train and the driving leg of the tractor drive mechanism neednot be strictly straight, but may have some degree of curvature, along the ascending path where the pushers mesh with the buckets, while still keeping the flexure stresses in the cables or other tension elements at such a low level as to be no substantial problem, in terms of causing wear and tear.

The illustrated endless loop tractor drive mechanism employs a pair of endless drive chains, with the pushers connected at spaced intervals therebetween. However, the endless drive chains may be replaced with other equivalent endless drive members, such as endless flexible members made of wire rope or the like.

The intermediate portions of the pushers are offset so that they are in a trailing relation relative to the end portions of the pushers, connected to the drive chains. The amount of offsetting may be varied, so that the drive rollers on the pushers trail behind the end portions thereof which are connected to the drive chains. In this way, the drive rollers contact the buckets at points which trail behind the end portions of the pushers, to stabilize the pushing action of the pushers.

Other modifications, alternative constructions and equivalents may be employed, without departing from the true spirit and scope of the invention, as defined in the following claims.

I claim:

1. A materials handling machine for moving loose bulk material from an underlying pile, comprising
   an axially flexible endless bucket train, formed of a plurality of flexible and nonextendable axial tension element means which are flexible in all lateral directions, a corresponding plurality of buckets, and means securing the buckets on the tension element means at generally equal axial spacings from one another; and means including a plurality of support wheels for engaging, flexing and directing the bucket train to define between certain of the wheels a loading span adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material;
   said buckets having generally circular bottoms connecting with annular side walls of generally circular cross section,
   drive means to circulate the bucket train unidirectionally around an endless path on the wheels, said drive means being spaced above the pile of the loose bulk material and being disposed along the ascending path of the bucket train where the filled buckets are being moved upwardly;
   said drive means including elongated endless loop means having a plurality of pushers thereon at equal spacings around the loop means and generally corresponding to the axial spacings of the buckets on the bucket train, the loop means having a driving leg extending alongside the ascending path of the bucket train;
   the pushers on the driving leg of the loop means being disposed to mesh with the bucket train and to engage the bottoms of corresponding buckets as they travel along the ascending path of the bucket train;
   and power means operable for circulating the endless loop means to cause the pushers in engaging the buckets to lift the filled buckets and to circulate the bucket train around its endless path on the wheels for relieving the stresses on the axial tension element means and thereby avoiding the deleterious effects of said stresses when combined with the flexing of said axial tension element means as the bucket train passes around the support wheels.

2. A materials handling machine according to claim 1, in which the driving leg of the loop means is elongated sufficiently relative to the spacing of the pushers from one another to provide a plurality of pushers meshing with the bucket train and in driving engagement with the bottoms of a plurality of the buckets, whereby the driving load is shared by a plurality of the pushers and a plurality of the buckets.

3. A materials handling machine according to claim 1, including anti-friction means carried on the pushers and engageable with the bottoms of the buckets in axial symmetry therewith for minimizing abrasion and friction between the pushers and the buckets.

4. A materials handling machine according to claim 1, including at least two anti-friction drive rollers rotatably mounted on each of the pushers for driving engagement with the bottoms of the corresponding buckets for minimizing and abrasion between the pushers and the buckets, the rollers being mounted symmetrically on opposite sides of the tension element means.

5. A materials handling machine for moving loose bulk material from an underlying pile, comprising
   an axially flexible endless bucket train, formed of a plurality of flexible and nonextendable axial tension element means which are flexible in all lateral directions, a corresponding plurality of buckets, and means securing the buckets on the tension element means at generally equal axial spacings from one another; means including a plurality of support wheels for engaging, flexing and directing the bucket train to define between certain of the wheels a loading span hanging loosely along a catenary curve and adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material;
   said buckets having generally circular bottoms connecting with annular side walls of generally circular cross section,
   drive means to circulate the bucket train unidirectionally around an endless path on the wheels, said drive means being spaced above the pile of the loose bulk material and being disposed along the ascending path of the bucket train where the filled buckets are being moved upwardly;

said drive means including elongated endless loop means comprising a pair of endless drive chains having driving legs extending alongside the ascending path of the bucket train on opposite sides thereof and aligned with the axial tension element means;

drive sprockets around which the drive chains are trained, and pushers having cross members connected between the separate drive chains and extending transversely to the bucket train, said pushers being at equal spacings around the drive chains and corresponding to the axial spacing of the buckets on the bucket train;

the pushers being disposed to mesh with the bucket train along the driving legs of the drive chains and having pusher members on the cross members for engaging the bottoms of the corresponding buckets with axial symmetry relative thereto as they travel along the ascending path of the bucket train;

and power means for rotating the drive sprockets and thereby circulating the endless drive chains to cause the pusher members to engage and lift the corresponding buckets and to circulate the drive train around its endless path on the wheels for relieving the stresses on the axial tension element means and thereby avoiding the deleterious effects of said stresses when combined with the flexing of said axial tension element means as the bucket train passes around the support wheels;

the driving legs of the drive chains being sufficiently elongated relative to the spacing between the pushers to provide a plurality of pushers for meshing with the bucket train and for engaging and pushing the corresponding buckets to share the driving load.

6. A materials handling machine according to claim 5, in which the ascending path of the bucket train is relatively straight where the pushers on the drive chains engage and lift the buckets, the drive chains being located close to one of the wheels over which the bucket train travels to begin the inversion and dumping of the buckets.

7. A materials handling machine for moving loose bulk material from an underlying pile, comprising
an endless bucket train, formed of a plurality of flexible and nonextendable tension element means, a corresponding plurality of buckets, and means securing the buckets on the tension element means at generally equal axial spacings from one another; means including a plurality of support wheels for directing the bucket train to define between certain of the wheels a loading span adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material;

drive means to circulate the bucket train unidirectionally around an endless path on the wheels, said drive means being spaced above the pile of the loose bulk material and being disposed along the ascending path of the bucket train where the filled buckets are being moved upwardly;

said drive means including elongated endless loop means having a driving leg extending alongside the ascending path of the bucket train;

said loop means including a pair of endless drive chains disposed on opposite sides of the tension element means, drive sprockets around which the drive chains are trained, and pushers connected between the separate drive chains and extending transversely to the bucket train, said pushers being at equal spacings around the drive chains and corresponding to the axial spacing of the buckets on the bucket train;

the pushers on the driving leg of the loop means being disposed to mesh with the bucket train and to engage the bottoms of the corresponding buckets as they travel along the ascending path of the bucket train;

and power means for rotating the drive sprockets and thereby circulating the endless drive chains to cause the pushers to engage and lift the corresponding buckets and to circulate the drive train around its endless path on the wheels;

the driving leg of the loop means being sufficiently elongated relative to the spacing between the pushers to provide a plurality of pushers for meshing with the drive train and for engaging and pushing the corresponding buckets to share the driving load;

said drive means including longitudinal guide means for guiding the drive chains along the ascending leg of the bucket train to stabilize the positions and orientation of the pushers relative to the bucket train.

8. A materials handling machine according to claim 7, said guide means including inner and outer guide walls disposed along the inner and outer sides of the drive chains along the driving leg of the loop means where the pushers are meshing with the bucket train for engaging and driving the buckets, whereby the pushers are accurately positioned and oriented relative to the buckets.

9. A materials handling machine according to claim 7, including at least two anti-friction rollers on the pushers for engaging and pushing the buckets of the bucket train to minimize friction and abrasion between the pushers and the buckets, and additional anti-friction rollers on the pushers and engageable with the tension element means for minimizing friction and abrasion between the pushers and the tension element means.

10. A materials handling machine according to claim 7, in which the ascending path of the bucket train is substantially straight where the pushers mesh with the bucket train, whereby the tension element means are not subject to substantial flexure in the locations where the pushers are in driving engagement with the buckets.

11. A materials handling machine for moving loose bulk material from an underlying pile, comprising
an endless bucket train, formed of a plurality of flexible and nonextendable tension element means, a corresponding plurality of buckets, and means securing the buckets on the tension element means at generally equal axial spacings from one another; and means including a plurality of support wheels for directing the bucket train to define between certain of the wheels a loading span adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material;

drive means to circulate the bucket train unidirectionally around an endless path on the wheels, said drive means being spaced above the pile of the loose bulk material and being disposed along the ascending path of the bucket train where the filled buckets are being moved upwardly;

said drive means including elongated endless loop means having a plurality of pushers thereon at equal spacings around the loop means and generally corresponding to the axial spacings of the buckets on the bucket train, the loop means having a driving leg extending alongside the ascending path of the bucket train;

the pushers on the driving leg of the loop means being disposed to mesh with the bucket train and to engage the bottoms of corresponding buckets as they travel along the ascending path of the bucket train;

and power means operable for circulating the endless loop means to cause the pushers in engaging the buckets to lift the filled buckets and to circulate the bucket train around its endless path on the wheels, said machine including an anti-friction roller mounted on each of the pushers and engageable with the tension element means for minimizing friction and abrasion between each pusher and the tension element means.

12. A materials handling machine for moving loose bulk material from an underlying pile, comprising an endless bucket train, formed of a plurality of flexible and nonextendable tension element means, a corresponding plurality of buckets, and means securing the buckets on the tension element means at generally equal axial spacings from one another;

and means including a plurality of support wheels for directing the bucket train to define between certain of the wheels a loading span adapted to pass the bucket train through the pile of the bulk material so as to fill the buckets, and to define between certain other of the wheels an unloading span adapted to inert the buckets so as to dump the material from the buckets of the bucket train, the bucket train being directed along an ascending path after the buckets are filled with the bulk material;

drive means to circulate the bucket train unidirectionally around an endless path on the wheels, said drive means being spaced above the pile of the loose bulk material and being disposed along the ascending path of the bucket train where the filled buckets are being moved upwardly;

said drive means including elongated endless loop means having a plurality of pushers thereon at equal spacings around the loop means and generally corresponding to the axial spacings of the buckets on the bucket train, the loop means having a driving leg extending alongside the ascending path of the bucket train;

the pushers on the driving leg of the loop means being disposed to mesh with the bucket train and to engage the bottoms of corresponding buckets as they travel along the ascending path of the bucket train;

and power means operable for circulating the endless loop means to cause the pushers in engaging the buckets to lift the filled buckets and to circulate the bucket train around its endless path on the wheels, said machine including at least two anti-friction drive rollers rotatably mounted on each of the pushers for driving engagement with the corresponding buckets for minimizing friction and abrasion between the pushers and the buckets, the rollers being mounted symmetrically on opposite sides of the tension element means, the drive rollers being mounted on the pushers to rotate about axes extending at acute angles relative to the direction of movement of the bucket train, the drive rollers having conically tapered peripheral surfaces extending at approximately forty-five degrees relative to the axes of rotation for engaging the buckets.

13. A materials handling machine for moving loose bulk material from an underlying pile, comprising an endless bucket train, formed of a plurality of flexible and nonextendable tension element means, a corresponding plurality of buckets, and means securing the buckets on the tension element means at generally equal axial spacings from one another;

and means including a plurality of support wheels for directing the bucket train to define between certain of the wheels a loading span adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material;

drive means to circulate the bucket train unidirectionally around an endless path on the wheels, said drive means being spaced above the pile of the loose bulk material and being disposed along the ascending path of the bucket train where the filled buckets are being moved upwardly;

said drive means including elongated endless loop means having a plurality of pushers thereon at equal spacings around the loop means and generally corresponding to the axial spacings of the buckets on the bucket train, the loop means having a driving leg extending alongside the ascending path of the bucket train;

the pushers on the driving leg of the loop means being disposed to mesh with the bucket train and to engage the bottoms of corresponding buckets as they travel along the ascending path of the bucket train;

and power means operable for circulating the endless loop means to cause the pushers in engaging the buckets to lift the filled buckets and to circulate the bucket train around its endless path on the wheels, said endless loop means comprising a pair of endless drive chains extending alongside the ascending leg of the bucket train on opposite sides thereof, and drive sprockets around which the drive chains are trained, the pushers being connected between the drive chains and extending transversely to the bucket train, said machine including longitudinal guide members for guiding the movement of the drive chains alongside the bucket train for stabilizing the positions and orientation of the pushers relative to the bucket train.

14. A materials handling machine for moving loose bulk material from an underlying pile, comprising an endless bucket train, formed of a plurality of flexible and nonextendable tension element means, a corresponding plurality of buckets, and means securing the buckets on the tension element means at generally equal axial spacings from one another; means including a plurality of support wheels for directing the bucket train to define between certain of the wheels a loading span adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material;

drive means to circulate the bucket train unidirectionally around an endless path on the wheels, said drive means being spaced above the pile of the loose bulk material and being disposed along the ascending path of the bucket train where the filled buckets are being moved upwardly; the bucket train for engaging and driving the buckets, whereby the pushers are accurately positioned and oriented relative to the buckets.

15. A materials handling machine according to claim 14, said guide means including inner and outer guide walls disposed along the inner and outer sides of the drive chains along the driving leg of the loop means where the pushers are meshing with transversely to the bucket train, said pushers being at equal spacings around the drive chains and corresponding to the axial spacing of the buckets on the bucket train;

the pushers on the driving leg of the loop means being disposed to mesh with the bucket train and to engage the bottoms of the corresponding buckets as they travel along the ascending path of the bucket train;

and power means for rotating the drive sprockets and thereby circulating the endless drive chains to cause the pushers to engage and lift the corresponding buckets and to circulate the drive train around its endless path on the wheels;

the driving leg of the loop means being sufficiently elongated relative to the spacing between the pushers to provide a plurality of pushers for meshing with the bucket train and for engaging and pushing the corresponding buckets to share the driving load, said machine including anti-friction rollers on the pushers and engageable with the tension element means for minimizing friction and abrasion between the pushers and the tension element means.

16. A materials handling machine for moving loose bulk material from an underlying pile, comprising an endless bucket train, formed of a plurality of flexible and nonextendable tension element means, a corresponding plurality of buckets, and means securing the buckets on the tension element means at generally equal axial spacings from one another; means including a plurality of support wheels for directing the bucket train to define between certain of the wheels a loading span adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material;

drive means to circulate the bucket train unidirectionally around and endless path on the wheels, said drive means being spaced above the pile of the loose bulk material and being disposed along the ascending path of the bucket train where the filled buckets are being moved upwardly;

said drive means including elongated endless loop means having a driving leg extending alongside the ascending path of the bucket train;

said loop means including a pair of endless drive chains disposed on opposite sides of the tension element means, drive sprockets around which the drive chains are trained, and pushers connected between the separate drive chains and extending said drive means including elongated endless loop means having a driving leg extending alongside the ascending path of the bucket train;

said loop means including a pair of endless drive chains disposed on opposite sides of the tension element means, drive sprockets around which the drive chains are trained, and pushers connected between the separate drive chains and extending transversely to the bucket train, said pushers being at equal spacings around the drive chains and corresponding to the axial spacing of the buckets on the bucket train;

the pushers on the driving leg of the loop means being disposed to mesh with the bucket train and to engage the bottoms of the corresponding buckets as they travel along the ascending path of the bucket train;

and power means for rotating the drive sprockets and thereby circulating the endless drive chains to cause the pushers to engage and lift the corresponding buckets and to circulate the drive train around its endless path on the wheels;

the driving leg of the loop means being sufficiently elongated relative to the spacing between the pushers to provide a plurality of pushers for meshing with the bucket train and for engaging and pushing the corresponding buckets to share the driving load, said machine including longitudinal guide means for guiding the drive chains along the ascending leg of the bucket train to stabilize the positions and orientation of the pushers relative to the bucket train.

17. A materials handling machine according to claim 16, including additional anti-friction rollers on the pushers for engaging and pushing the buckets of the bucket train to minimize friction and abrasion between the pushers and the buckets.

18. A materials handling machine for moving loose bulk material from an underlying pile, comprising an axially flexible endless bucket train, formed of a plurality of flexible and nonextendable axial tension element means which are flexible in all lateral directions, a corresponding plurality of buckets, and means securing the buckets on the tension element means at generally equal axial spacings from one another; and means including a plurality of support wheels for engaging, flexing and directing the bucket train to define between certain of the wheels a loading span adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material;

said buckets having generally circular bottoms connecting with annular side walls of generally circular cross section, first power drive means for rotatably driving at least one support wheel of said support wheels for circulating the bucket train unidirectionally around an endless path on the wheels, at least said one support wheel having means meshing with the bucket train for supplying driving effort to the bucket train, second drive means for supplying additional driving effort to circulate the bucket train unidirectionally around said endless path on the wheels, said second drive means being spaced above the pile of the loose bulk material and being disposed along the ascending path of the bucket train where the filled buckets are being moved upwardly;

said second drive means including elongated endless loop means having a plurality of pushers thereon at equal spacings around the loop means and generally corresponding to the axial spacings of the buckets on the bucket train, the loop means having a driving leg extending alongside the ascending path of the bucket train;

the pushers on the driving leg of the loop means being disposed to mesh with the bucket train and to engage the bottoms of corresponding buckets as they travel along the ascending path of the bucket train;

and power means operable for circulating the endless loop means to cause the pushers in engaging the buckets to lift the filled buckets and supply additional driving effort to circulate the bucket train around its endless path on the wheels for relieving the stresses on the axial tension element means and thereby avoiding the deleterious effects of said stresses when combined with the flexing of said axial tension element means as the bucket train passes around the support wheels.

19. A materials handling machine for moving loose bulk material from an underlying pile, comprising an axially flexible endless bucket train, formed of a plurality of flexible and nonextendable axial tension element means which are flexible in all lateral directions, a corresponding plurality of buckets, and means securing the buckets on the tension element means at generally equal axial spacings from one another; and means including a plurality of support wheels for directing the bucket train to define between certain of the wheels a loading span adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material;

said buckets having generally circular bottoms connecting with annular side walls of generally circular cross section, drive means to circulate the bucket train unidirectionally around an endless path on the wheels, said drive means being spaced above the pile of the loose bulk material and being disposed along the ascending path of the bucket train where the filled buckets are being moved upwardly;

said drive means including elongated endless loop means having a plurality of pushers thereon at equal spacings around the loop means and generally corresponding to the axial spacings of the buckets on the bucket train, the loop means having a driving leg extending alongside the ascending path of the bucket train;

the pushers on the driving leg of the loop means being disposed to mesh with the bucket train and to engage the bottoms of corresponding buckets as they travel along the ascending path of the bucket train;

and power means operable for circulating the endless loop means to cause the pushers in engaging the buckets to lift the filled buckets and to circulate the bucket train around its endless path on the wheels;

said endless loop means having a plurality of drive wheel means, said endless loop means being trained around said drive wheel means, and longitudinally disposed guide means disposed longitudinally along the driving leg of said endless loop means for stabilizing said driving leg and thereby stabilizing the positions and orientation of the pushers relative to the bucket train.

20. A materials handling machine for moving loose bulk material from an underlying pile, comprising an axially flexible endless bucket train, formed of a plurality of flexible and nonextendable axial tension element means which are flexible in all lateral directions, a corresponding plurality of axially symmetrical buckets, and means securing the buckets on the tension element means in axial symmetry therewith and at generally equal axial spacings from one another; and means including a plurality of support wheels for engaging, flexing and directing the bucket train to define between certain of the wheels a loading span adapted to pass the bucket train through the pile of the bulk material so as to fill the buckets, and to define between certain other of the wheels an unloading span adapted to invert the buckets so as to dump the material from the buckets of the bucket train, the bucket train being directed along an ascending path after the buckets are filled with the bulk material;

said buckets having generally circular bottoms connecting with annular side walls of generally circular cross section, drive means to circulate the bucket train unidirectionally around an endless path on the wheels, said drive means being spaced above the pile of the loose bulk material and being disposed along the ascending path of the bucket train where the filled buckets are being moved upwardly;

said drive means including elongated endless loop means having a plurality of pushers thereon at equal spacings around the loop means and generally corresponding to the axial spacings of the buckets on the bucket train, the loop means having a driving leg extending alongside the ascending path of the bucket train;

the pushers on the driving leg of the loop means being disposed to mesh with the bucket train and to engage the bottoms of corresponding buckets as they travel along the ascending path of the bucket train;

and power means operable for circulating the endless loop means to cause the pushers in engaging the buckets to lift the filled buckets and to circulate the bucket train around its endless path on the wheels for relieving the stresses on the axial tension element means and thereby avoiding the deleterious effects of said stresses when combined with the flexing of said axial tension element means as the bucket train passes around the support wheels, said endless loop means comprising a pair of endless drive chains extending alongside the ascending leg of the bucket train on opposite sides thereof, and drive sprockets around which the drive chains are trained, the pushers including respective cross members connected between the drive chains and extending transversely to the bucket train, the pushers including respective anti-friction roller means mounted on said cross members in axial symmetry with the buckets and engageable with the bottoms of the buckets for exerting pushing forces on said bottoms while minimizing friction and abrasion therewith.

* * * * *